(12) United States Patent
Evans et al.

(10) Patent No.: US 7,051,562 B2
(45) Date of Patent: May 30, 2006

(54) RETAINER CLIP FOR LOCK PLUGS

(75) Inventors: Evan Earl Evans, Colorado Springs, CO (US); James Douglas Ohl, Augusta, GA (US)

(73) Assignee: Schlage Lock Company, Indianapolis, IN (US)

( * ) Notice: Subject to any disclaimer, the term of this patent is extended or adjusted under 35 U.S.C. 154(b) by 0 days.

(21) Appl. No.: 10/677,068

(22) Filed: Oct. 1, 2003

(65) Prior Publication Data

US 2005/0072197 A1    Apr. 7, 2005

(51) Int. Cl.
*E05B 9/04*    (2006.01)
(52) U.S. Cl. .......................... 70/370; 70/368; 70/371; 70/372; 70/379 R; 70/381; 70/424; 70/451; 403/315; 403/DIG. 7; 411/517; 411/519
(58) Field of Classification Search .............. 70/368, 70/375, 370–372, 367, 369, 451, 466, 379 R, 70/380, 379 A, 381, 385, 391, 422–424; 411/209–211, 516, 517, 519, 530; 403/315, 403/316, 318, DIG. 7
See application file for complete search history.

(56) References Cited

U.S. PATENT DOCUMENTS

| | | | |
|---|---|---|---|
| 1,299,691 A * | 4/1919 | Dery ........................ 411/210 |
| 1,835,725 A * | 12/1931 | Thompson et al. .......... 70/372 |
| 1,846,822 A | 2/1932 | Vogt |
| 2,059,695 A | 11/1936 | Jacobi |
| 2,059,698 A | 11/1936 | Jacobi |
| 2,348,135 A | 5/1944 | Jacobi |
| 2,883,848 A | 4/1959 | Wolniak |
| 3,257,831 A | 6/1966 | Schlage |
| 3,324,693 A | 6/1967 | Check |
| 3,429,154 A | 2/1969 | Schwartz |
| 3,526,111 A | 9/1970 | Jacobi |
| 3,722,241 A * | 3/1973 | Sussina ..................... 70/495 |
| 4,012,928 A | 3/1977 | Dauenbaugh |
| 4,228,668 A | 10/1980 | Scherbing |
| 4,703,638 A | 11/1987 | Bergstrom |
| 5,323,554 A * | 6/1994 | MacDonald ................ 40/633 |
| 5,431,034 A | 7/1995 | Fann et al. |
| 5,603,532 A * | 2/1997 | Guest ....................... 285/305 |
| 5,857,800 A * | 1/1999 | Nell ......................... 403/344 |
| 5,884,512 A | 3/1999 | Wayne |
| 5,921,122 A * | 7/1999 | Lin .......................... 70/368 |
| 5,931,035 A * | 8/1999 | Bolton ...................... 70/367 |
| 6,301,942 B1 | 10/2001 | Shvarts |
| 6,349,579 B1 | 2/2002 | Canard |
| 6,644,076 B1 * | 11/2003 | Huang ..................... 70/379 R |

* cited by examiner

*Primary Examiner*—Lloyd A. Gall
(74) *Attorney, Agent, or Firm*—Michael Best & Friedrich LLP

(57) ABSTRACT

A retainer clip is used for retaining a lock plug within a bore of a lock housing. The retainer clip includes a generally arcuate body disposeable about the plug outer surface and having a radial retention surface positionable generally against a housing end surface so as to prevent axial displacement of the plug along the bore. Two projections are each disposed proximal to a separate end of the body, each projection being disposeable within a separate plug opening when the body is disposed on the plug to retain the clip engaged therewith. The clip body has a hinge, a first arm portion extending between the hinge and one free end and a second arm portion extending between the hinge and the other end. The hinge is configured so that the two arm portions are deflectable generally about the hinge to move with respect to each other during installation and removal.

21 Claims, 6 Drawing Sheets

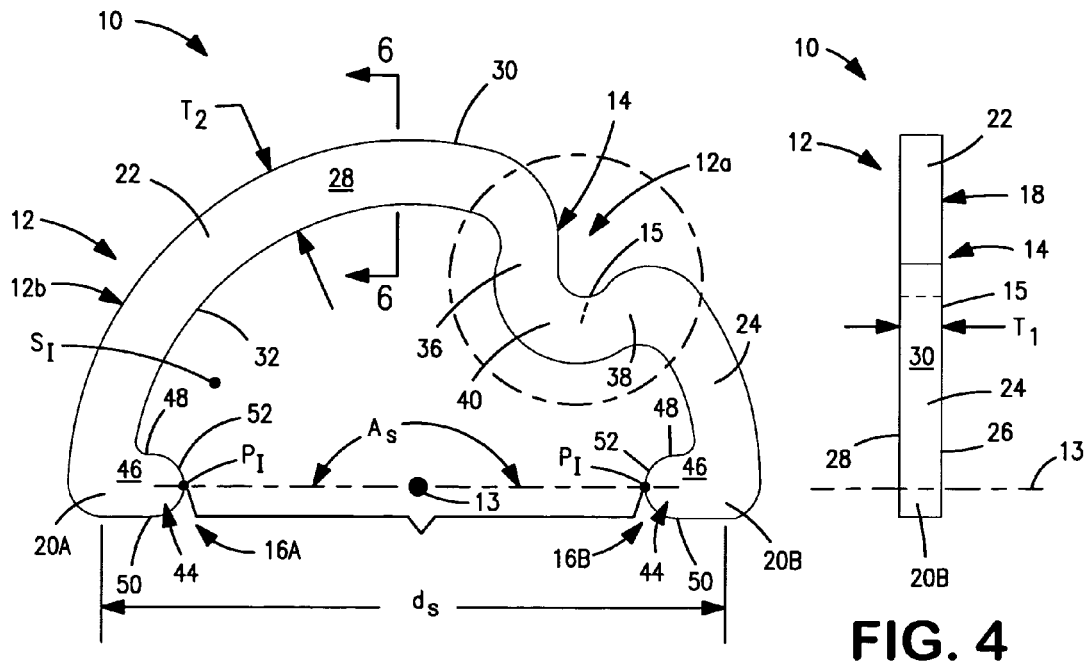
FIG. 3
FIG. 4
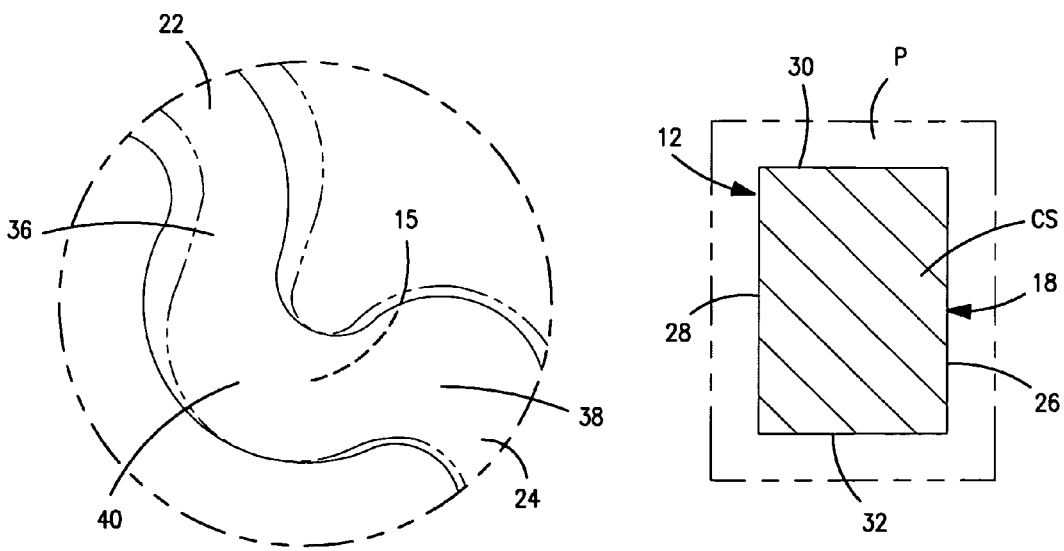
FIG. 5
FIG. 6

RETAINER CLIP FOR LOCK PLUGS

BACKGROUND OF THE INVENTION

The present invention relates to lock assemblies, and more specifically to clips for axially retaining lock plugs within a lock housing.

Cylinder lock assemblies generally include a cylinder plug disposed within a bore of a cylinder shell or housing. The plug includes a keyway configured to accept a key, such that slidably displacing the appropriate key into the keyway operates a plurality of pins to enable plug to rotate within the housing bore and thereby actuate the lock. Typically, a retainer clip, such as a C-clip or circlip, is disposed about one end of the plug so as to limit axial displacement of the plug within the bore, and thereby functions to retain the plug disposed within the housing.

SUMMARY OF THE INVENTION

In one aspect, the present invention is a retainer clip for retaining a lock plug within a bore of a lock housing. The housing has a central axis extending through the bore and an end surface extending generally radially with respect to the bore axis and the plug having a longitudinal centerline, an outer circumferential surface and two openings spaced circumferentially about the outer surface. The retainer clip comprises a generally arcuate body disposeable about the plug outer surface and having a generally radial retention surface. The retention surface is positionable generally against the housing end surface so as to prevent axial displacement of the plug along the bore axis, and first and second free ends. Further, two projections are each disposed proximal to a separate one of the two body ends. Each projection is disposeable within a separate one of the plug openings when the body is disposed on the plug outer surface so as to generally retain the clip engaged with the plug.

In another aspect, the present invention is also a retainer clip for retaining a lock plug within a bore of a lock housing. The housing has a central axis extending through the bore and an end surface extending generally radially with respect to the bore axis. The retainer clip comprises a generally arcuate body disposeable about the plug and having a retention surface positionable generally against the housing end surface so as to prevent axial displacement of the plug along the bore axis. The body has a central hinge portion, a first arm portion extending between the hinge portion and a first free end, and a second arm portion extending between the hinge portion and a second free end, the second end being spaced from the first end. The hinge portion is configured such that at least one of the two arm portions is deflectable generally about the hinge portion so as to move with respect to the other one of the two arm portions.

In a further aspect, the present invention is again a retainer clip for retaining a lock plug within a bore of a lock housing. The housing has a longitudinal axis extending through the bore and an end surface extending generally radially with respect to the axis and the plug has an outer circumferential surface. The clip comprises a generally arcuate body extending circumferentially about a centerline, the body having two opposing free ends and a radial retention surface extending between the ends. The retention surface is positionable generally against the housing end surface so as prevent axial displacement of the plug along the bore axis. Further, an integral hinge portion is disposed between the two ends and extends generally radially inwardly with respect to a remainder of the body and generally toward the body centerline. The hinge is configured to displace at least one of the two ends with respect to the other one of the two ends.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings:

FIG. 3 is an enlarged front plan view of the retainer clip;

FIG. 4 is an enlarged side plan view of the retainer clip;

FIG. 5 is a greatly enlarged view of a hinge portion of the clip, indicated as view 4 in FIG. 3;

FIG. 6 is cross-sectional view of the clip taken through line 6—6 of FIG. 3;

DETAILED DESCRIPTION OF THE INVENTION

Figure 2:
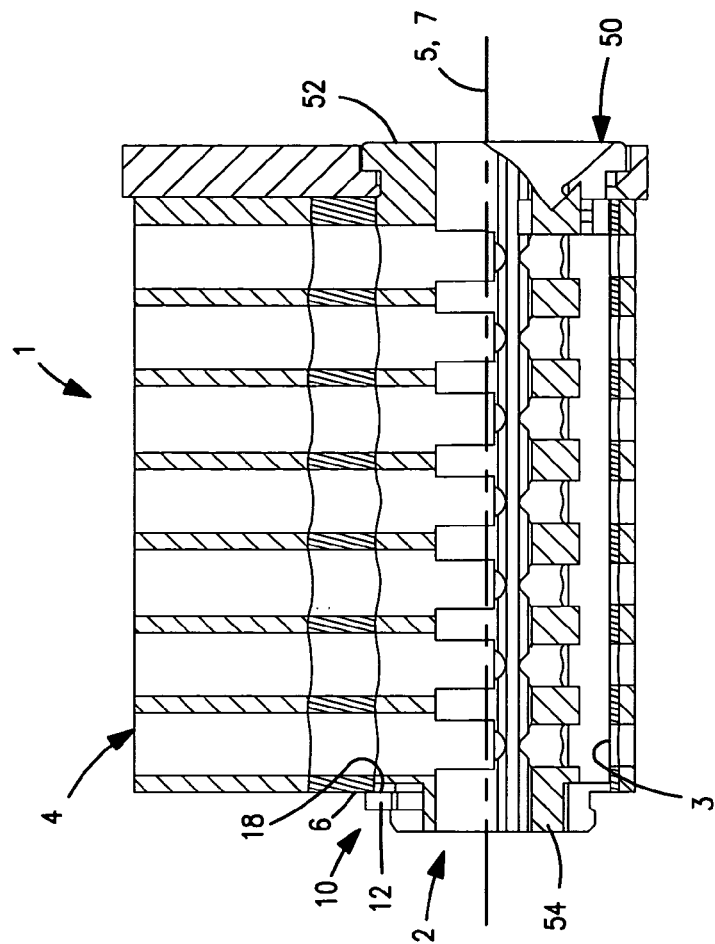
FIG. 2 is a side cross-sectional view of the lock assembly.
Figure 1:
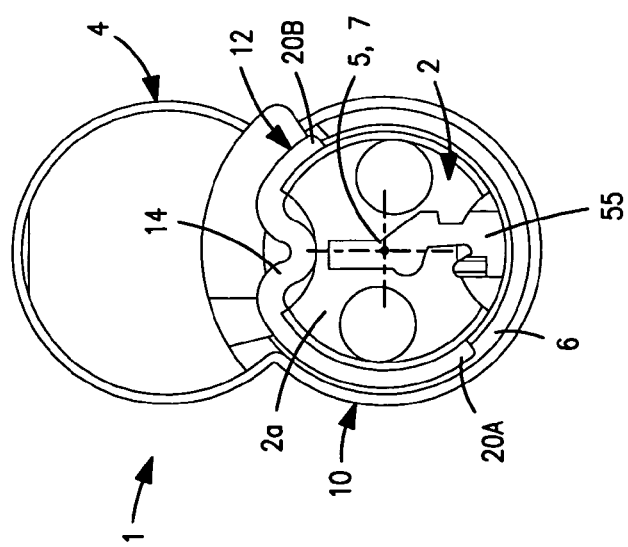
FIG. 1 is a rear elevational view of a lock assembly including a retainer clip in accordance with the present invention.

Certain terminology is used in the following description for convenience only and is not limiting. The words "right", left", "lower", "upper", "upward", "down" and "downward" designate directions in the drawings to which reference is made. The words "inner", "inwardly" and "outer", "outwardly" refer to directions toward and away from, respectively, a designated centerline or a geometric center of an element being described, the particular meaning being readily apparent from the context of the description. Further, as used herein, the word "connected" is intended to include direct connections between two members without any other members interposed therebetween and indirect connections between members in which one or more other members are interposed therebetween. The terminology includes the words specifically mentioned above, derivatives thereof, and words or similar import.

Referring now to the drawings in detail, wherein like numbers are used to indicate like elements throughout, there is shown in FIGS. 1–13 a retainer clip 10 for retaining a lock plug 2 within a bore 3 of a lock housing 4. The retainer clip 10 preferably forms part of a lock assembly 1 including the housing 4, which preferably has a central axis 5 extending through the bore 3 and an end surface 6 extending generally radially with respect to the bore axis 5, and the plug 2, which preferably has a longitudinal centerline 7, an outer circumferential surface 8 and two openings 9A, 9B spaced circumferentially about the outer surface 8. The retainer clip 10 basically comprises a generally arcuate body 12 disposeable about the plug outer surface 8 and having a central, integral hinge portion 14, two projections 16A, 16B, and a radial retention surface 18. The arcuate body 12 has first and second free ends 20A, 20B, the body second end 20B being spaced from the first end 20A by a spacing distance $d_s$, and a clip opening 17 defined generally between the two ends 20A, 20B through which a portion of the plug 2 passes as the body 12 is installed about and removed from the plug 2. The retention surface 18 is positionable generally against the housing end surface 6 when the clip 12 is disposed about the plug 2 so as to prevent axial displacement of the plug 2 along the bore axis 5. The two projections 16A, 16B are each disposed proximal to a separate one of the two body ends 20A, 20B, respectively, and are located so as to define the clip opening 17, as discussed in further detail below. Further, each projection 16A, 16B is disposeable within a separate one of the plug openings 9A, 9B when the body 12 is disposed on the plug outer surface 8 so as to generally retain the clip 10 engaged with the plug 2. Preferably, the plug openings 9A, 9B and the projections 16A, 16B are each angularly spaced apart about the plug 2 and the clip 10, respectively, by about one-hundred eighty degrees, such that the clip 10 is disposeable upon the plug 2 alternatively in first and second orientations, as discussed below.

Furthermore, the body 12 has a first arm portion 22 extending between the hinge portion 14 and the body first end 20A and a second arm portion 24 extending between the hinge portion 14 and the body second end 20B. The hinge portion 14 is configured such that at least one of the two arm portions 22, 24 is deflectable generally about the hinge portion 14 so as to move with respect to the other one of the two arm portions 24, 22 when a force F is applied to the clip 10, as discussed below. In other words, the hinge portion or "hinge" 14 is configured such that the one arm portion 22 or 24 is movable with respect to the other arm portion 24, 22 so as to increase the spacing distance $d_s$, and thereby increase the size of the clip opening 17, when the clip 10 is being installed upon or removed from the plug 2. Thus, the hinge 14 basically functions to facilitate installation and removal of the clip 10. Having described the basic elements of the present invention, these and other elements and or features of the clip 10 of the present invention are described in detail below.

Figure 7:
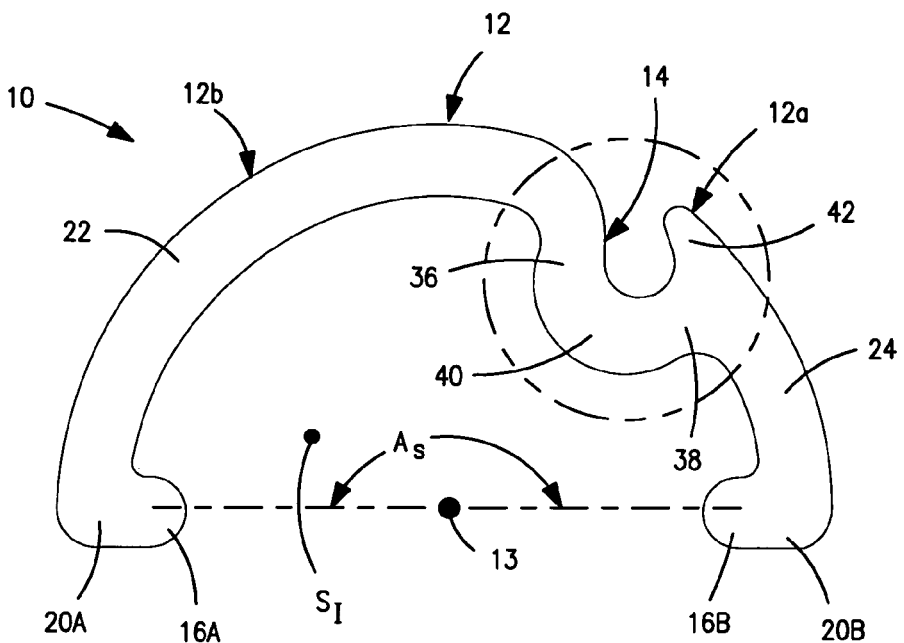
FIG. 7 is an enlarged plan view of the retainer clip showing an alternative construction of the hinge portion.

Referring now to FIGS. 3–8, the clip body 12 bounds an interior space $S_I$ inside of which a portion 2a of the plug 2 is disposed when the clip 12 is assembled onto the plug 2. The body 12 is preferably generally semicircularly shaped or "semicircular" and partially circumscribes (i.e., extends circumferentially about) a centerline 13. As such, the two body free ends 20A, 20B are angularly spaced apart about the centerline 13 by about one-hundred eighty degrees, as indicated by angle $A_s$ (FIGS. 3 and 7). However, the body 12 may extend a greater or lesser angular distance about the centerline 13, such that the ends 20A, 20B are angularly spaced apart by more or less than one-hundred eighty degrees (i.e., $A_s$ <> 180°). Preferably, the body 12 has a central bended portion 12a disposed between the two ends 20A, 20B and offset radially inwardly with respect to a remainder 12b of the body 12, which most preferably provides the hinge 14, but may alternatively be constructed solely to provide a key stop surface 15, as discussed in further detail below.

Further, the arcuate body 12 preferably has first and second substantially flat and parallel, opposing radial end surfaces 26, 28, which are spaced apart by a substantially constant thickness $T_1$ at all points on the body 12 between the two ends 20A, 20B, the first surface 26 providing the stop surface 18. The body 12 also has generally parallel, outer and inner circumferential surfaces 30, 32, respectively, which are spaced apart by a substantially constant thickness $T_2$ at most points on the body 12 between the two ends 20A, 20B, i.e., at locations other than the hinge 14 and the projections 16A, 16B. The inner surface 32 provides a contact surface that is disposeable against the plug outer surface 8. By having two pairs of parallel surfaces 26, 28 and 30, 32, the body 12 has a generally rectangular cross-section CS in any plane P that extends through both pairs of surfaces 26, 28 and 30, 32, as shown in FIG. 5. With the above-described body structure, the clip 10 engages the lock housing 4 and the plug 2 with surfaces 18, 32, respectively, which provide a much greater contact area than previous clip designs. More specifically, known clips generally have circular cross-sections and only make "line" contact with the housing 4 and plug 2. Alternatively, the body 12 may be formed so as to have any other appropriate shape, such as for example, with circular or ovular cross-sections.

Still referring to FIGS. 3–8, the hinge 14 is preferably generally U-shaped (or generally V-shaped) and extends radially inwardly from the remainder of the body 12 (i.e., the two arm portions 22, 24). Being offset radially-inwardly, the hinge 14 provides a key stop surface 15 configured to limit axial movement of a key (not shown) within the plug 2 when the clip 10 is located in the second orientation, as discussed in further detail below. Preferably, the hinge 14 is located more proximal to one of the two body ends 20A, 20B, most preferably the second body end 20B, than to the other one of the two body ends 20B, 20A (i.e., first body end 20A). As such, one of the two arm portions 22, 24, preferably the first arm portion 22, is substantially longer than the other one of the two arm portions 24, 22 (i.e., second arm portion 24). However, the hinge 14 may alternatively be substantially centered on the body 12 such that the two arm portions 22, 24 have generally equal length.

Preferably, the U-shaped hinge 14 is constructed so as to include a first "leg" section 36 connected with the first arm portion 22, a second "leg" section 38 connected with the second arm portion 24, and a "base" section or joint 40 integrally connecting the first and second sections 36 and 38. Each one of the two hinge sections 36, 38 extends at least partially radially inwardly from the connected arm portion 22, 24 and generally toward the body centerline 13, so as to radially offset the hinge 14 from the remainder of the body 12, as discussed above. Further, the hinge 14 is configured to "fold", as discussed below, such that at least one of the two hinge sections 36, 38 (and preferably both) is deflectable with respect to the other one of the two hinge sections 38, 36 so as to generally pivot the connected arm portion 22, 24 with respect to the other arm portion 24, 22. In other words, the two hinge sections 36, 38 are each bendable about the joint 40 such that the two sections 36, 38 are moveable toward and alternatively away from each other, thereby displacing the connected arm portion 22 or 24 in a like manner.

Specifically, in order to install (or remove) the clip 10 upon/from the plug 2, the spacing distance $d_s$ between the body ends 20A, 20B must be increased to increase the size of the clip opening 17 to allow the plug portion 2a to pass through the opening 17 as the body 12 becomes disposed about (or withdrawn from) the plug 2. To increase the size of the clip opening 17, a force F is applied to the clip 10 to cause at least one of the two arm portions 22, 24 (preferably both) to pivotally displace generally away from the other arm portion 24, 22. Preferably, the force F arises from the interaction between the clip 10 and the plug 2; specifically, pressing the clip 12 against or onto the plug 2 such that the plug 2 "wedges" apart the body ends 20A, 20B. When such a force F is applied, the hinge 14 "folds" such that the hinge leg sections 36, 38 each move generally toward the other hinge section 38, 36 as the two arm sections 22, 24 pivot to displace the body ends 20A, 20B generally away from each other. By having the foldable hinge section 14, the amount of force required to displace the body ends 20A, 20B away from each other (i.e., to increase the clip opening 17) is lesser than that required for previously known retainer clips (none shown), which "open" by bending the entire clip body in the manner of a beam. Furthermore, when the force F is released or removed from the clip 12, the hinge 12 also functions to displace the two arm portions 22, 24 back to an undeflected or "relaxed" state, such that the hinge 14 generally functions in the manner of a leaf spring.

Figure 8:
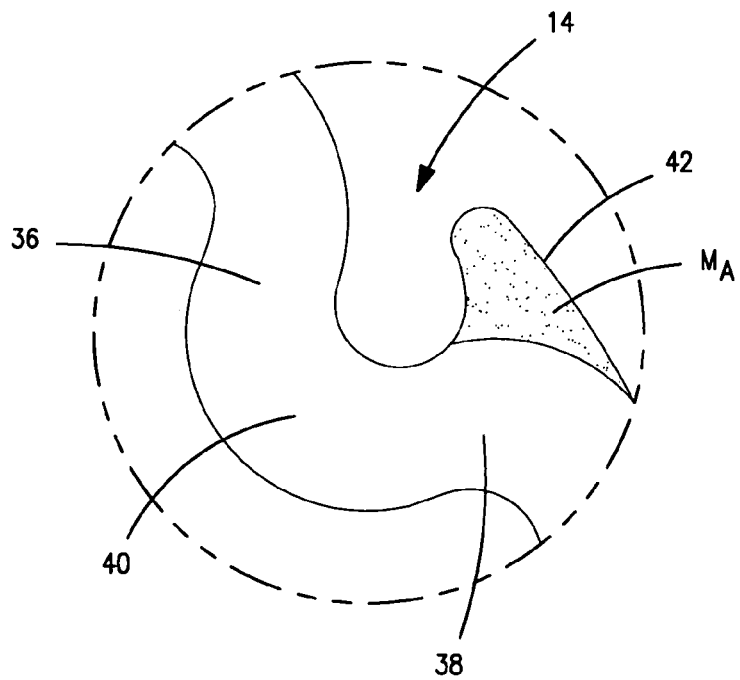
FIG. 8 is a greatly enlarged view of the alternative hinge portion of the clip, indicated as view 6 in FIG. 6.

Referring to FIGS. 7–8, an alternative construction of the hinge 14 is generally similar to the structure described above and depicted in FIGS. 3, 5 and 9–11, except for the following basic difference. The alternative hinge construction further includes an extension or "spur" section 42 extending generally circumferentially from the hinge second section 38 and generally toward the hinge first section 36. The spur section 42 provides additional body material $M_A$, as indicated by the shaded area of FIG. 8, which is located so as to increase the total surface area of the retention surface 18, which increases the maximum axial force that the clip 10 can resist without disengaging from the plug 2.

Referring to FIGS. 3 and 6, each projection 16A, 16B preferably extends generally radially inwardly from the body inner surface 32 and generally toward the centerline 13 (and the opposing projection 16B, 16A). As such, the two projections 16A, 16B each extends generally toward the plug centerline 7 when the body 12 is disposed about the plug outer surface 8. As discussed above, the clip opening 17 is defined between the two projections 16A, 16B, specifically between the radially innermost points $P_I$ of the two projections 16A, 16B, such that a portion of the plug 2 that becomes disposed within the clip interior space $S_I$ must pass between the two projections 16A, 16B. However, for a clip 10 formed without the two projections 16A, 16B (not preferred), the clip opening 17 is instead defined between the radially innermost points of the body ends 20A, 20B (structure not shown). By having the two projections 16A, 16B, the clip body 12 is able to be formed with a generally semicircular shape, so as to be separately positionable in two different orientations on the plug 2 (as discussed below), while still being sufficiently engageable about the plug outer surface 8 to retain the clip 10 disposed on the plug 2. In other words, if the clip 10 did not have the two projections 16A, 16B for engagement with the plug 2, the clip body 12 should be formed so as to extend more than one hundred eighty degrees about the plug outer surface 8 to prevent the clip 10 from being easily dislodged from the plug 2.

Figure 9:
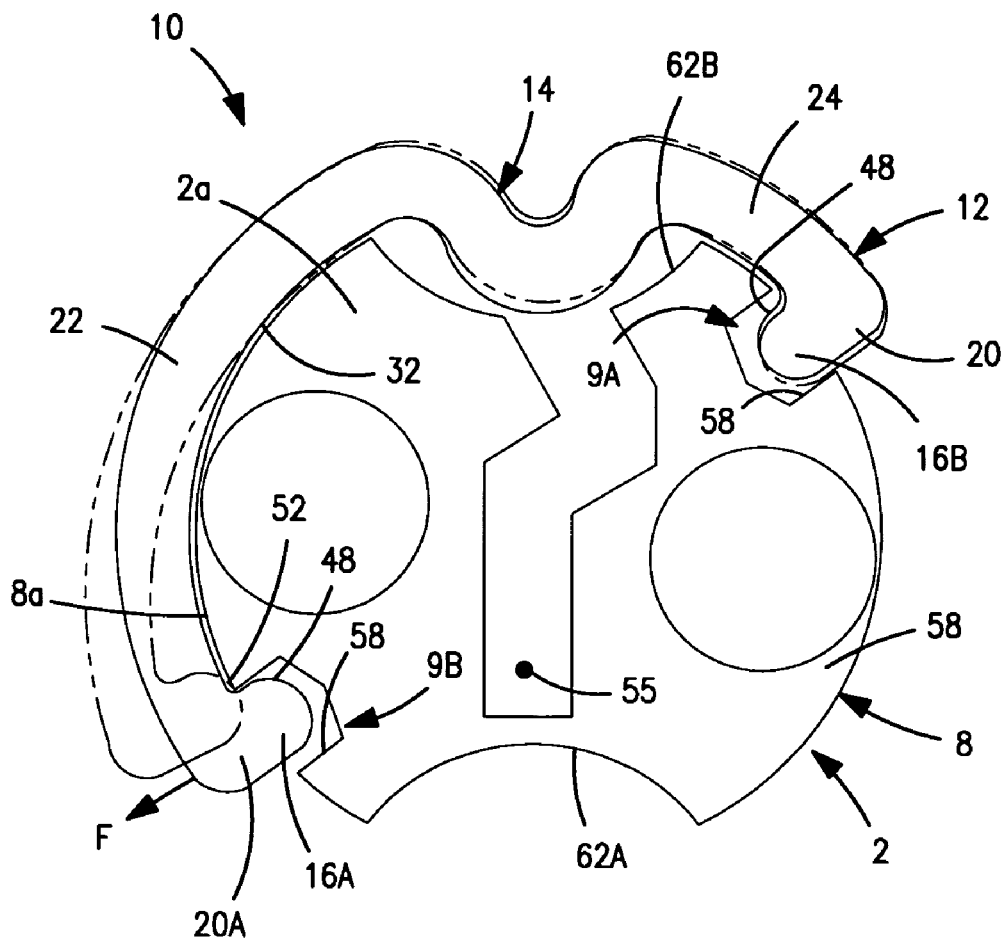
FIG. 9 is a rear view of a lock plug with the clip assembled thereon, showing the clip in a deflected with phantom lines.
Figure 10:
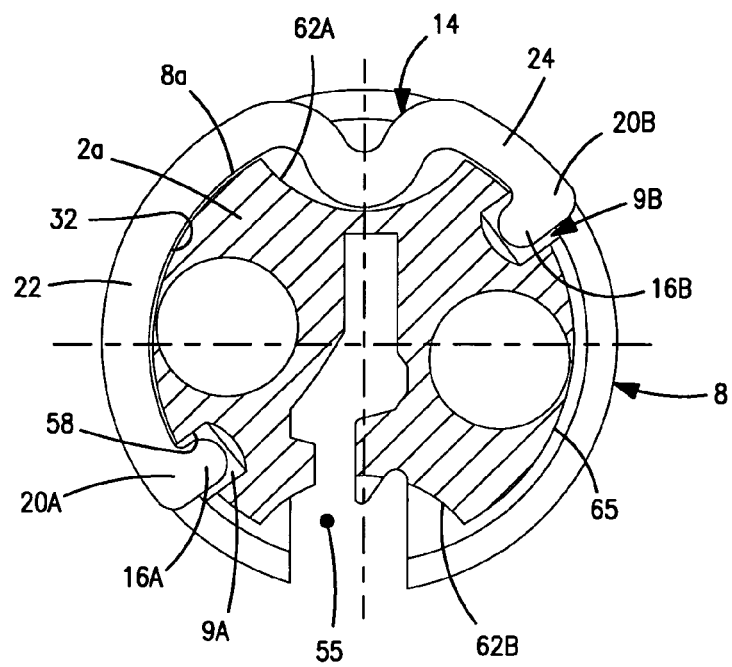
FIG. 10 is a radial cross-sectional view of the plug with the clip assembled thereon, showing the clip in a first orientation.
Figure 11:
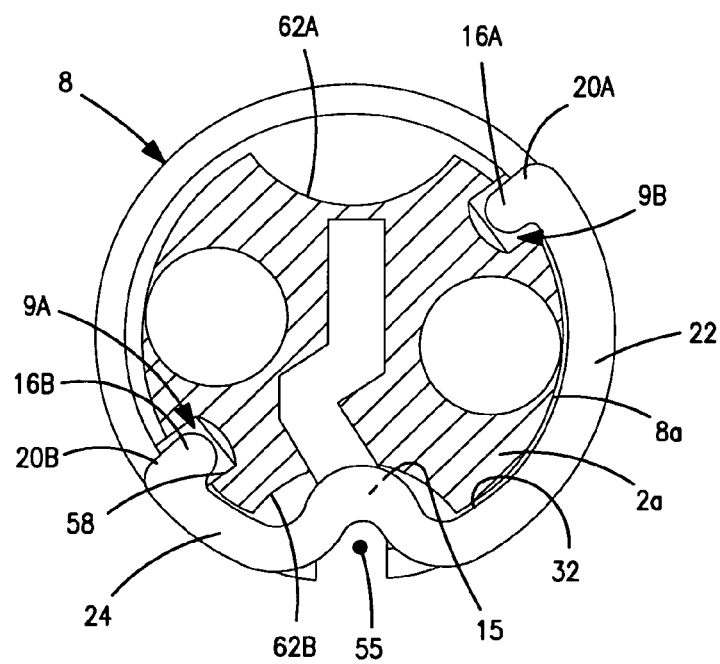
FIG. 11 is a radial cross-sectional view of the plug with the clip assembled thereon, showing the clip in a second orientation.
Figure 13:
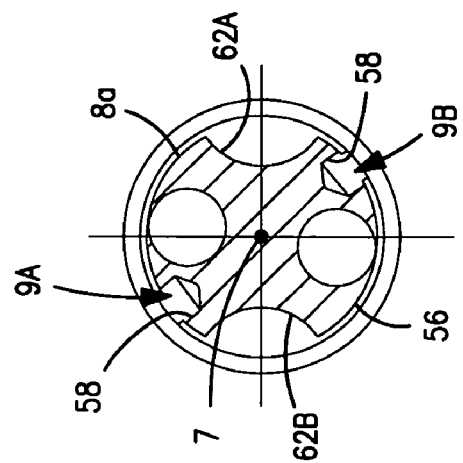
FIG. 13 is a radial cross-sectional view of the lock plug.
Figure 12:
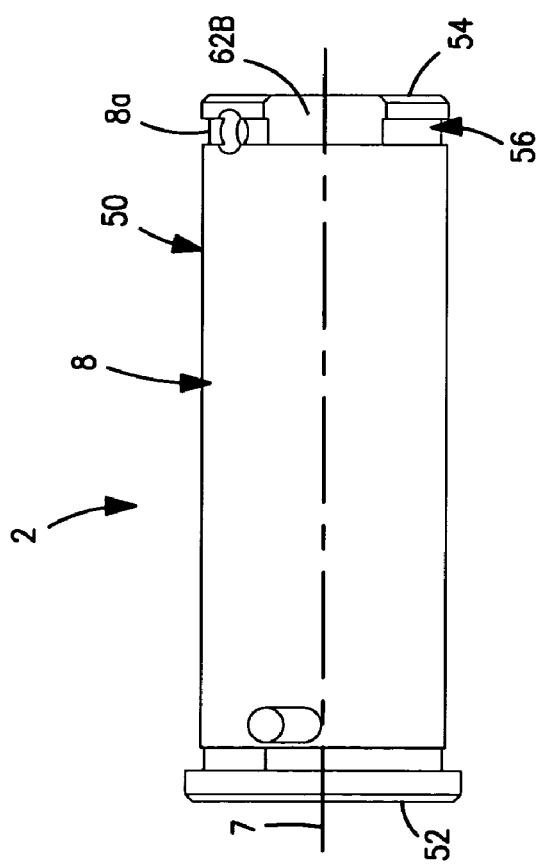
FIG. 12 is a side view of a preferred lock plug.

Preferably, each projection 16A, 16B is formed as a generally flat, generally rounded tab 44, although each projection 16A, 16B may have any other appropriate shape (e.g., circular cylindrical, hemispherical, conical, etc.). Specifically, each tab 44 has two opposing, generally flat radial surfaces 46 (only one shown), each being substantially coplanar with the proximal body radial end surface 26, 28, respectively, opposing inner and outer side surfaces 48, 50 extending generally radially from the body inner circumferential surface 32, and a rounded inner edge surface 52 extending between the side surfaces 48, 50. As discussed in further detail below, when the clip 10 is being installed upon the plug 2, the rounded inner edge surfaces 52 of the projections 16A, 16B slide against the plug outer surface 8 until the two projections 16A, 16B each become disposed within one of the plug openings 9A or 9B, as best shown in FIG. 9. Thereafter, the inner side edge surface 48 of each projection 16A, 16B acts generally against the inner circumferential surface 58 (discussed below) of the particular plug opening 9A or 9B to retain the projection 16A, 16B disposed within the opening 9A or 9B, and thereby retain the clip body 12 disposed about the plug 2.

Preferably, the three main portions of the body 12, specifically the hinge portion 14 and the two arm portions 22, 24, are all integrally formed, and most preferably the projections 16A, 16B are also integrally formed with the body 12. As such, the clip 10 of the present invention is preferably of one-piece construction. However, the clip 10 may alternatively be formed of separate projections attached to the body 12, and/or the body 12 may be formed of three or more a separate, attached or connected together sections. Further, the clip 10 is preferably formed of steel and fabricated by stamping, but may alternatively be formed of any other material, for example aluminum or a polymeric material, and/or may be formed in any other appropriate manufacturing process, such as casting, machining, forming, injection molding, etc. Furthermore, although the clip 10 of the present invention preferably includes both the hinge 14 and the two projections 16A, 16B, the clip 10 may alternatively be formed with a substantially arcuate body 12 (i.e., as opposed to "generally arcuate") without an inwardly offset hinge portion and with the two projections 16A, 16B, or may be formed with a hinge 14 and without any projections.

Referring now to FIGS. 1, 2 and 9–13, the retainer clip 10 of the present invention is preferably used with a lock plug 2 having a generally circular cylindrical body 50 with opposing front and rear axial ends 52, 54, respectively, and a keyway 55 extending between the ends 52, 54. An annular groove 56 is located proximal to the body rear end 54 is sized to receive the clip 10, as discussed below. The groove 56 extends both radially inwardly from the plug outer surface 8 into the body 50 and circumferentially about the plug centerline 7, and provides an inwardly offset section 8a of the plug outer surface 8. The two plug openings 9A, 9B each extend radially inwardly from the groove 56 and into the body 50 and are angularly spaced apart about the centerline 7 by about one hundred eighty degrees (not indicated). Each plug opening 9A, 9B is bounded by an inner circumferential surface 58 against which a projection inner side edge surface 48 acts, as discussed above. Further, the plug body 50 also has first and second opposing, generally semicircular cut-out sections 62A, 62B that are each sized to separately receive a portion of the hinge 14. Each cutout section 62A, 62B extends radially inwardly from the plug outer surface 8 and axially between the groove 56 and the body rear end 54. Furthermore, the keyway 55 extends into second cut-out section 62B, such the hinge 14 functions as a key tip stop when the clip 10 is located in the second orientation (FIG. 11), as discussed below.

Referring to FIGS. 1 and 9–11, the retainer clip 10 of the present invention is installable upon the plug 2 in a first orientation (FIGS. 1 and 10), and alternatively in a second orientation (FIG. 9 and 11), in generally the following manner. Preferably, the projection 16B located proximal to the body second end 20B is first inserted into either the second plug opening 9B (first clip orientation) or into the first plug opening 9A (second clip orientation). Then, with the first projection 16A disposed against the plug outer surface section 8a within the groove 56, the clip 10 is pushed generally toward the plug centerline 7 such that first projection rounded edge surface 52 slides against the plug outer surface section 8a toward the other plug opening 9A or 9B, so that the plug 2 wedges the body first end 20A apart from the body second end 20B. Such movement of the body ends 20A, 20B cause the first and second arm portions 22, 24 to pivot generally away from each other about the hinge 14 as a portion 2a of the plug 2 enters the clip interior space $S_I$. When the first projection 16A slides or "snaps" into the other plug opening 9A or 9B, the first and second arm portions 22, 24 pivot generally back toward each other about the hinge 14 and the clip 10 is fully disposed about or engaged with the plug 2. Specifically, the body contact surface 32 is disposed against the plug outer surface section 8a, the retention surface 18 is disposed generally against the housing end surface 6 (see FIG. 2), and the hinge 14 is disposed within one of the plug cut-out sections 62A or 62B. Alternatively, the clip 10 may be installed on the plug 2 by first inserting the first projection 16A into one of the plug openings 9A or 9B, and then pushing the clip 10 onto the plug 2 until the second projection 16B enters the other plug opening 9B, 9A.

When the clip 10 is arranged in the first orientation (FIGS. 1 and 10), the hinge 14 is disposed generally within the plug first cutout section 62A, such that the keyway 55 is open at the plug body second end 54. However, when the clip 10 is located within the second orientation (FIGS. 9 and 11), the hinge 14 is disposed generally within the plug second cutout section 62B, such that the hinge 14 obstructs the keyway 55. As such, when a key (not shown) is inserted through the keyway 55, the tip of the key will contact the hinge stop surface 15, such that further axial displacement of the key is thereby prevented. Further, to the remove the clip 10 from the plug 2, a force F is preferably applied to one of the body ends 20A or 20B to remove the respective proximal projection 16A, 16B from one plug opening 9A or 9B, as indicated in FIG. 9. The clip 10 is pulled generally away from the plug centerline 7 until a sufficient portion of the body 12 is disengaged from the plug 2 to enable the other projection 16B, 16A to be pulled from the other plug opening 9B or 9A.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A lock assembly comprising:
 a housing having a bore, a central axis extending through the bore and a radial end surface;
 a lock plug disposeable within the housing bore and having a longitudinal centerline, an outer circumferential surface and two openings spaced circumferentially about the outer surface; and
 a retainer clip configured to retain the plug within the bore and including:
 a generally arcuate body disposeable generally upon the plug outer surface and having a generally radial retention surface, the retention surface being positionable generally against the housing end surface so as to prevent axial displacement of the plug along the bore axis, and first and second free ends, and a central bended portion disposed between the two ends, offset radially inwardly with respect to a remainder of the body and providing an integral, foldable hinge; and
 two projections each disposed proximal to a separate one of the two body ends, each projection being disposeable within a separate one of the plug openings when the body is disposed on the plug outer surface so as to generally retain the clip engaged with the plug, the body being deflectable generally about the hinge portion during installation and removal of the projections from the plug openings.

2. The lock assembly as recited in claim 1 wherein the body has an inner circumferential surface and each projection extends generally radially inwardly from the body inner surface.

3. The lock assembly as recited in claim 2 wherein the two projections each extend generally toward the plug centerline when the body is disposed about the plug outer surface.

4. The lock assembly as recited in claim 1 wherein the body is generally semicircularly shaped.

5. The lock assembly as recited in claim 1 wherein the body partially circumscribes a centerline and the two body free ends are angularly spaced apart about the centerline by about one hundred eighty degrees.

6. The lock assembly as recited in claim 1 wherein the clip body is disposeable upon the plug in a first orientation at which the hinge is located proximal to a first section of the plug outer surface and is alternatively disposeable upon the plug in a second orientation at which the hinge is located proximal to a second section of the plug outer surface, the plug first and second surface sections facing generally in opposing directions away from the plug axis.

7. The lock assembly as recited in claim 1 wherein the body has two opposing generally parallel, generally flat radial surfaces, one of the two radial surfaces providing the retention surface, and two opposing, generally parallel inner and outer circumferential surfaces such that the body has a generally rectangular cross-section in any plane extending generally perpendicularly through the two radial surfaces.

8. The lock assembly as recited in claim 1 wherein the body includes a first arm portion extending between the hinge and the first free end and a second arm portion extending between the hinge portion and the second free end, the hinge portion being configured such that at least one of the two arm portions is deflectable generally about the hinge portion so as to move with respect to the other one of the two arm portions.

9. The lock assembly as recited in claim 8 wherein the body first and second ends are spaced apart by a distance and the hinge is configured such that the one arm portion is movable with respect to the other arm portion so as to increase the spacing distance when the clip is one of being installed upon the plug and being removed from the plug.

10. A lock assembly comprising:
 a housing having a bore, a central axis extending through the bore and an end surface extending generally radially with respect to the bore axis;
 a lock plug disposeable within the housing bore and having an axially extending keyway, an outer circumferential surface, first and second cut-out sections extending radially into the outer surface, the second section extending into the keyway; and
 a retainer clip configured to retain the plug within the bore and including a generally arcuate body disposeable generally upon the plug outer surface and having a retention surface positionable generally against the housing end surface so as to prevent axial displacement of the plug along the bore axis, the body having a central hinge portion, a first arm portion extending between the hinge portion and a first free end, and a second arm portion extending between the hinge portion and a second free end, the second end being spaced from the first end, the hinge portion being configured such that at least one of the two arm portions is deflectable generally about the hinge portion so as to move with respect to the other one of the two arm portions, the clip body being disposeable upon the plug in a first orientation at which the hinge portion is disposed within the first cut-out section and alternatively disposeable upon the plug in a second orientation at which the hinge portion is disposed within the second cut-out section, the hinge having a radially extending stop surface located to prevent movement of a key within the keyway along the bore axis when the body is disposed in the second orientation.

11. The lock assembly as recited in claim 10 wherein the body first and second ends are spaced apart by a distance and the hinge is configured such that the one arm portion is movable with respect to the other arm portion so as to increase the spacing distance when the clip is one of being installed upon the plug and being removed from the plug.

12. The lock assembly as recited in claim 10 wherein the body hinge portion includes a first section connected with the first arm portion and a second section connected with the second arm portion and with the first section, at least one of the two hinge sections being deflectable with respect to the other one of the two hinge sections so as to generally pivot a connected one of the two body arm portions with respect to the other one of the two body arm portions.

13. The lock assembly as recited in claim 12 wherein the body partially circumscribes a centerline, each one of the two arm portions extends generally circumferentially with respect to the axis, and each one of the two hinge sections extends at least partially radially inwardly from the connected arm portion and generally toward the axis.

14. The lock assembly as recited in claim 10 wherein the hinge portion is offset generally radially inwardly with respect to the two arm portions.

15. The lock assembly as recited in claim 10 wherein the hinge portion is generally U-shaped.

16. The lock assembly as recited in claim 10 wherein the hinge portion is integrally formed with each one of the two arm portions such that the clip is of one-piece construction.

17. The lock assembly as recited in claim 10 wherein the body partially circumscribes a centerline and the two body free ends are angularly spaced apart about the centerline by about one hundred eighty degrees.

18. The lock assembly as recited in claim 17 wherein:
the lock plug has a central axis, an outer circumferential surface extending about the axis and two openings extending radially inwardly from the outer surface, the two openings being angularly spaced apart about the axis by about one-hundred eighty degrees; and
the clip further includes two projections each extending radially inwardly from a separate one of the body free ends, each clip projection being separately disposeable within each one of the two plug openings.

19. The lock assembly as recited in claim 10 wherein the first arm portion has substantially greater length than the second arm portion such that the hinge is located more proximal to the second end than to the first end.

20. The lock assembly as recited in claim 10 wherein the body has two opposing generally parallel, generally flat radial surfaces, one of the two radial surfaces providing the retention surface, and two opposing, generally parallel inner and outer circumferential surfaces such that the body has a generally rectangular cross-section in any plane extending generally perpendicularly through the two radial surfaces.

21. A lock assembly comprising:
a lock housing having a bore, a longitudinal centerline extending though the bore, and an end surface extending generally radially with respect to a bore axis;
a lock plug disposeable within the housing bore and having an outer circumferential surface; and
a generally arcuate retainer clip disposeable generally upon the plug outer surface and having a retention surface positionable generally against the housing end surface so as to prevent axial displacement of the plug along the bore axis, the clip having a central bended portion offset radially inwardly with respect to a remainder of the clip and providing an integral, foldable hinge, a first arm portion extending between the hinge and a first free end, and a second arm portion extending between the hinge and a second free end, the second end being spaced from the first end, at least one of the two arm portions being pivotable about the hinge with respect to the other one of the two arm portions so as to vary a spacing distance between the two ends.

* * * * *